United States Patent [19]

Iwashita et al.

[11] Patent Number: 4,671,233
[45] Date of Patent: Jun. 9, 1987

[54] CYLINDER HEAD VARIABLE SWIRL SIAMESE TYPE INTAKE PORT STRUCTURE INCLUDING BIASING MEANS DIVERTING MIXTURE FLOW TOWARDS DIVERTING MEANS WHICH BYPASSES STRAIGHT INTAKE PASSAGE CONTROL VALVE

[75] Inventors: Yoshihiro Iwashita; Takeshi Okumura, both of Toyota, Japan

[73] Assignee: Toyota Jidosha Kabushiki Kaisha, Japan

[21] Appl. No.: 895,379

[22] Filed: Aug. 11, 1986

[30] Foreign Application Priority Data

Aug. 27, 1985 [JP] Japan .................. 60-187726

[51] Int. Cl.⁴ ............................................. F02B 15/00
[52] U.S. Cl. .................................................. 123/308
[58] Field of Search ........... 123/308, 432, 306, 188 M

[56] References Cited

U.S. PATENT DOCUMENTS 4,548,175 10/1985 Kawai et al. .................. 123/308

FOREIGN PATENT DOCUMENTS 151718 11/1979 Japan .................. 123/308

*Primary Examiner*—E. Rollins Cross
*Attorney, Agent, or Firm*—James A. Oliff

[57] ABSTRACT

A variable swirl siamese type intake port structure for an internal combustion engine cylinder head includes a first generally straight intake passage which leads to a first intake port and a second generally helical intake passage which leads to a second intake port which is formed with a helical end vortex portion. A control valve is fitted in the first generally straight intake passage at an upstream portion thereof so as to control its flow resistance. A means is provided to the generally straight intake passage on the side thereof towards the generally helical intake passage, for, when the control valve is in its position to maximize the flow resistance of the generally straight intake passage, diverting a relatively minor proportion of air-fuel mixture sucked into the intake port structure from a point upstream of the control valve to a point near the downstream end of the first generally straight intake passage, thus bypassing the control valve. Further, there is provided a means for biasing flow of air-fuel mixture sucked into the intake port structure towards the diverting means. This diverting means may include an auxiliary passage formed from upstream of the control valve to a portion of the generally straight intake passage near the downstream end thereof, or alternatively a notch portion formed in said control valve, preferably in the edge thereof which is on the side thereof towards said generally helical intake passage.

11 Claims, 5 Drawing Figures

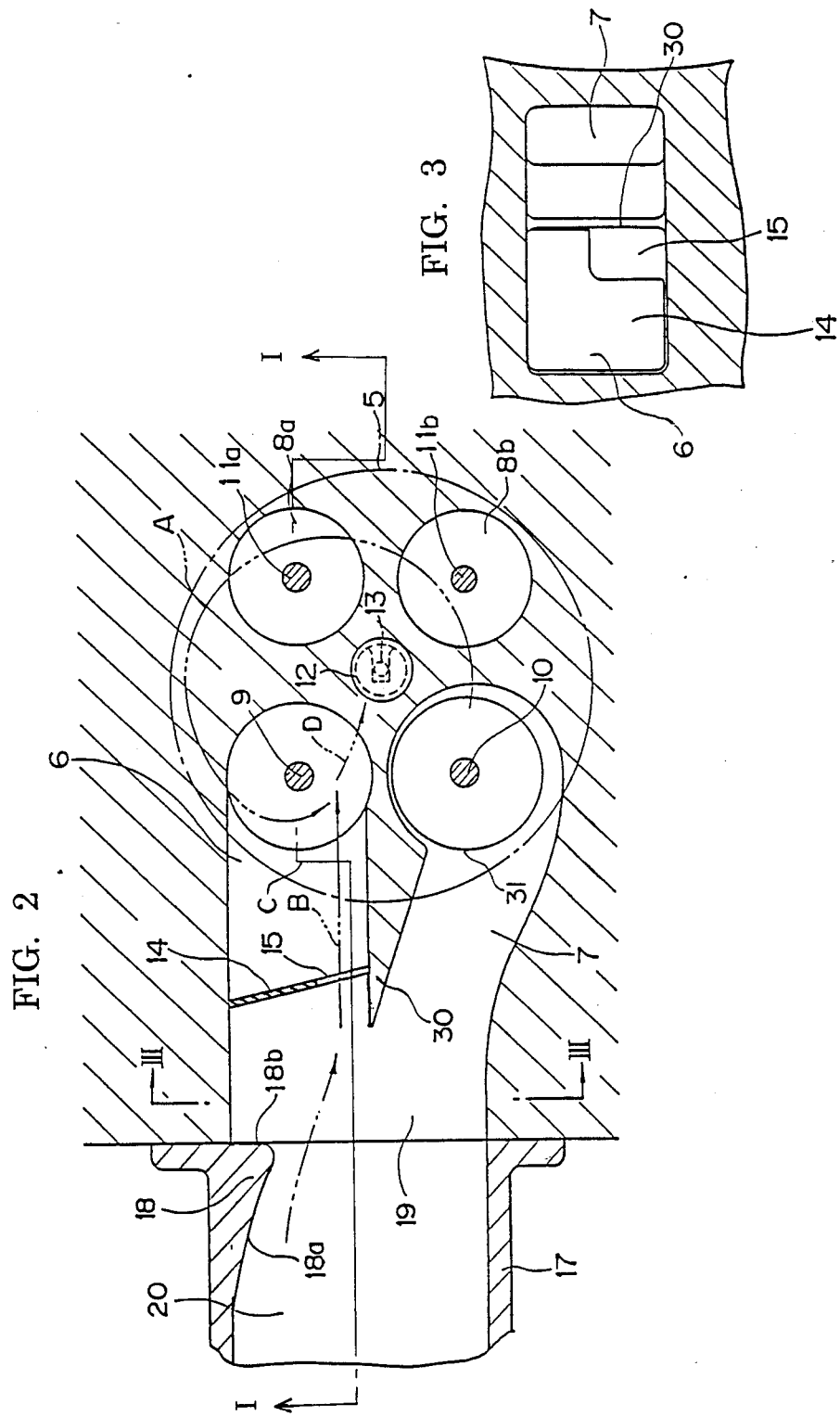

CYLINDER HEAD VARIABLE SWIRL SIAMESE TYPE INTAKE PORT STRUCTURE INCLUDING BIASING MEANS DIVERTING MIXTURE FLOW TOWARDS DIVERTING MEANS WHICH BYPASSES STRAIGHT INTAKE PASSAGE CONTROL VALVE

BACKGROUND OF THE INVENTION

The present invention relates to a variable swirl siamese type intake port structure for an internal combustion engine cylinder head, and more particularly relates to such a siamesed type variable swirl intake port structure for an internal combustion engine cylinder head, which incorporates two intake valves (and thus is of the three valve type or the four valve type) and a switch-over valve construction for selectively supplying intake air-fuel mixture to said two intake valves in varying proportions, and which is improved as regards air-fuel mixture swirling characteristics and volumetric efficiency in various operational conditions.

The present invention has been described in Japanese Patent Application Ser. No. 60-187726 (1985), filed by an applicant the same as the entity assigned or owed duty of assignment of the present patent application; and the present patent application hereby incorporates into itself by reference the text of said Japanese Patent Application and the claims and the drawings thereof; a copy is appended to the present application. Further, the present applicant wishes to attract the attention of the examining authorities to the existence of a copending U.S. patent application Ser. No. 887,658, which may be considered as relevant to the examination of the present patent application.

In the prior art, there are various types of intake port structures for internal combustion engine cylinder heads, and in particular for so called siamese type cylinder heads. Such intake port structures typically are of the variable swirl siamese type, in which the siamesed intake port comprises a generally straight intake passage and a generally helical intake passage arranged in parallel with said generally straight intake passage, so that both said generally straight intake passage and also said generally helical intake passage receive supply of intake air-fuel mixture from the engine intake manifold, with a control valve selectively at least partially interrupting the flow of air-fuel mixture through said straight intake passage, so as selectively to provide extra swirl for the intake air-fuel mixture being sucked into the combustion chamber of the engine, so as to improve combustibility, flame front propagation speed, and firing efficiency and thereby militate against engine knocking, thereby to allow the engine to be operated with a weaker intake air-fuel mixture than would otherwise be practicable. Such a construction typically includes a separating wall which divides between said generally straight intake passage and said generally helical intake passage. And a prior air to the present patent application, Japanese Patent Application Ser. No. 56-143215 (1981) which has been laid open as Japanese Patent Laying Open Publication Ser. No. 58-48715 (1983) and which was filed by an applicant the same as the applicant of the Japanese patent application of which the priority is being claimed in the present application and to whom either the present application is assigned or is owed a duty of assignment of the present application, discloses an improved siamesed type intake port structure for an internal combustion engine cylinder head which is provided with a bypass air passage through said separating wall, connecting a point on the generally straight intake passage downstream of said control valve provided therein to a vortex and wall of the generally helical intake passage.

With such an intake port structure for an internal combustion engine cylinder head, when the control valve is controlled to be in the closed state by a control system therefor, substantially all of the air-fuel mixture sucked in by the combustion chamber of the engine is inhaled through the generally helical intake passage, and is accordingly imparted with strong swirling; this mode of operation is appropriate for when the engine is operating at low load, as during the idling engine operating condition. In this condition, because of this swirling motion, the limit to which the air-fuel mixture being supplied to the engine can be weakened without engendering deleterious effects is extended. However, at this time the resistance presented to flow of air-fuel mixture by the generally helical intake passage by itself alone is high. On the other hand, when the control valve is controlled to be in the open state by the control system therefor, most of the air-fuel mixture sucked in by the combustion chamber of the engine is inhaled through the generally straight intake passage with only a minor proportion thereof being inhaled through the generally helical intake passage, and accordingly the inhaled air-fuel mixture as a whole is imparted with relatively weak swirling, thus accordingly causing the volumetric efficiency of the engine to be high so as to develop good engine power; this mode of operation is appropriate for when the engine is operating at high load, such as full load. At this time the resistance presented to flow of air-fuel mixture by the combination of the generally straight intake passage and the generally helical intake passage is relatively low.

There is however a problem with such an intake port structure for an internal combustion engine cylinder head, in that, when the control valve is thus controlled to be in the closed state by its control system and substantially all of the air-fuel mixture sucked in by the combustion chamber of the engine is being inhaled through the generally helical intake passage and is accordingly being imparted with strong swirling, although the apparent flame propagation speed is improved and the weak mixture limit is extended, nevertheless because of the swirling of the air-fuel mixture in the combustion chamber the fuel therein is preferentially thrown towards the periphery of the combustion chamber by centrifugal force, and so in the radial direction of the combustion chamber there is created an air/fuel ratio gradient, with the air-fuel mixture at the center portion of the combustion chamber being weaker than the air-fuel mixture at the edge portion thereof. Accordingly, if the air/fuel ratio of the overall air-fuel mixture being supplied to the combustion chamber is near the limit in the weakness direction, then the air/fuel ratio at the center portion of the combustion chamber may become too low for good ignition, and, since in such a three valve type or four valve type internal combustion engine it is convenient and usual to locate the spark plug at the center or approximate center of the combustion chamber, this means that the air/fuel ratio of the air-fuel mixture near and around the ignition portion of said spark plug may become too low for proper ignition. For this reason, according to the conventional art, it is not practicable to push the weakening of the intake air-fuel mixture to the limit, even although good combustion chamber swirling is being provided by such a siamese type intake port structure as detailed above.

Also, as a subsidiary desideratum for such a siamese type intake port structure for such an internal combustion engine cylinder head, it is important that, especially during transient driving conditions, the fuel supply responsiveness of the engine should be as good as possible.

In order to cope with the problems outlined above, the assignee or entity owed duty of assignment of the present patent application has already proposed, in copending Japanese Patent Application Ser. Nos. 60-1613149 (1985) and 60-163150 (1985) neither of which is it intended hereby to admit as prior art to the present patent application except to the extent otherwise required by applicable law, an intake port structure for an internal combustion engine of the general above described variable swirl siamese type, in which the siamesed intake port comprises a generally straight intake passage and a generally helical intake passage arranged in parallel with said generally straight intake passage so that both said generally straight intake passage and also said generally helical intake passage receive supply of intake air-fuel mixture from the engine intake manifold, and with a control valve provided so as selectively at least partially to interrupt the flow of air-fuel mixture through said straight intake passage so as selectively to provide extra swirl for the intake air-fuel mixture being sucked into the combustion chamber of the engine, characterized in that an auxiliary passage system, such as for example a substantially straight auxiliary passage, is provided for the above described generally straight intake passage which, even if the control valve is closed, maintains a certain degree of connection of said generally straight intake passage on its side towards said generally helical intake passage. In this variable swirl siamese type intake port structure, when the control valve fitted in the generally straight intake passage is closed, a relatively minor but still effective stream of air-fuel mixture flowing into said generally straight intake passage via the auxiliary passage system squirts into the combustion chamber, cuts across the vortex flow of air-fuel mixture set up in the combustion chamber by the generally helical intake passage and said second intake port, and impinges generally on the ignition point of the spark plug, also further entraining some of said swirling vortex flow in it, and thus ensures that the air/fuel ratio of the air-fuel mixture in the vicinity of said spark plug is not weakened by centrifugal effects or the like. Accordingly, even if the average air/fuel ratio for the engine is set relatively very weak, there is no risk engendered of misfiring, since the air/fuel ratio around the ignition point of the spark plug is ensured of being adequate; thus, the limit for weakening the air/fuel ratio for the engine is significantly extended. Further, considerable microturbulence is generated in the air-fuel mixture in the combustion chamber by the above described collision of this relatively minor but nevertheless effective straight flow from the generally straight intake passage and the vortex flow from the generally helical intake passage and the intake port connected thereto, and accordingly good combustion is further promoted and the air/fuel ratio weakening limit is further extended. On the other hand, when the control valve fitted in the generally straight intake passage is open, the stream of air-fuel mixture flowing through the auxiliary passage system squirts into the combustion chamber to be added to the quantities of air-fuel mixture supplied into the combustion chamber by the generally straight intake passage and the intake port connected thereto as well as the generally helical intake passage and its intake port, and thereby the engine volumetric efficiency is increased and its output power level is enhanced. Also, because these air-fuel mixture streams collide in the combustion chamber, again good microturbulence is engendered, and high speed combustion is made available. Thus, even if the spark plug is located in the generally central region of the combustion chamber as is typical with such three valve or four valve engine designs, no problem arises with the ignition of the mixture, and compact combustion is enabled, which increases the mechanical octane value for the engine as well as extending the limit for air-fuel ratio weakening. According to a particular specialization of the above concept, the auxiliary passage system may point through the intake port for the straight passage, when open, into the combustion chamber in a direction somewhat to tend to cancel large scale turbulence induced in said combustion chamber by flow through said generally helical intake passage and the intake port therefor; and further said auxiliary passage system may thus in fact point through said straight intake passage intake port, when open, into said combustion chamber in a direction somewhat to that side of the ignition point of the spark plug in the direction to tend to cancel large scale turbulence induced in said combustion chamber by flow through the generally helical intake passage and the intake port therefor. According to such a structure, the deleterious centrifugal effects in the combustion chamber are further remedied, and good microturbulence in the combustion chamber is further encouraged.

This above described intake port structure for an internal combustion engine of the variable swirl siamese type is successful in meeting the objects above, but however there still remain some problems in the operation of the internal combustion engine, associated with the degree of responsiveness obtainable at a time of acceleration operation, in particular at a time of accelerating away from a low load condition such as the idling operational condition.

SUMMARY OF THE INVENTION

Accordingly, it is the primary object of the present invention to provide a variable swirl siamese type intake port structure for an internal combustion engine cylinder head, which is improved over the prior art and avoids the problems detailed above.

It is a further object of the present invention to provide such a variable swirl siamese type intake port structure for an internal combustion engine cylinder head, which has good characteristics with regard to transient responsiveness of the engine, especially responsiveness in accelerating away from a low load condition such as the idling condition.

It is a further object of the present invention to provide such a variable swirl siamese type intake port structure for an internal combustion engine cylinder head, which allows engine output power to be enhanced.

It is a further object of the present invention to provide such a variable swirl siamese type intake port structure for an internal combustion engine cylinder head, which allows engine mechanical octane value to be enhanced.

It is a further object of the present invention to provide such a variable swirl siamese type intake port structure for an internal combustion engine cylinder head, which provides good ignition characteristics for the engine.

It is a further object of the present invention to provide such a variable swirl siamese type intake port structure for an internal combustion engine cylinder head, which allows the engine to be operated with a very weak mixture.

It is a further object of the present invention to provide such a variable swirl siamese type intake port structure for an internal combustion engine cylinder head, which allows for reduction of the flame propagation distance in the engine combustion chambers.

It is a further object of the present invention to provide such a variable swirl siamese type intake port structure for an internal combustion engine cylinder head, which has good characteristics with regard to engine volumetric efficiency.

It is a further object of the present invention to provide such a variable swirl siamese type intake port structure for an internal combustion engine cylinder head, which provides good microturbulence in the combustion chambers of the engine.

It is a further object of the present invention to provide such a variable swirl siamese type intake port structure for an internal combustion engine cylinder head, which provides supply of air-fuel mixture of relatively uniform air/fuel ratio to the combustion chambers of the engine.

It is a further object of the present invention to provide such a variable swirl siamese type intake port structure for an internal combustion engine cylinder head, which provides for good combustibility of said air-fuel mixture being supplied to the combustion chambers of the engine.

It is a further object of the present invention to provide such a variable swirl siamese type intake port structure for an internal combustion engine cylinder head, which provides stratified combustion in the combustion chambers of the engine.

According to the most general aspect of the present invention, these and other objects are attained by a variable swirl siamese type intake port structure for an internal combustion engine cylinder head formed with a combustion chamber to which a spark plug having an ignition point is provided, comprising: a first generally straight intake passage which leads to a first intake port opening to said combustion chamber; a second generally helical intake passage which leads to a second intake port, also opening to said combustion chamber, formed with a helical end vortex portion; a control valve fitted in said first generally straight intake passage at an upstream portion thereof so as to control its flow resistance; a means, provided to said generally straight intake passage on the side thereof towards said generally helical intake passage, for, when said control valve is in its position to maximize the flow resistance of said generally straight intake passage, diverting a relatively minor proportion of air-fuel mixture sucked into said intake port structure from a point upstream of said control valve to a point near the downstream end of said first generally straight intake passage, bypassing said control valve; and: a means for biasing flow of air-fuel mixture sucked into said intake port structure towards said diverting means.

According to such a structure as specified above, the liquid fuel which inevitably accumulates on the surface of the intake port structure is guided towards the diverting means by the biasing means, and further the amount of fuel passing through the intake passage structure as a whole is increased, as a result of which the responsiveness of the engine is improved during acceleration operation. Further, an appropriately saturated and stable air-fuel mixture with superior ignition characteristics is provided in the region of the igniting tip portion of the spark plug, i.e. in the central portion of the engine combustion chamber, and this provides a tendency towards stratified combustion, which allows the limit in the lean direction for weakening the air-fuel mixture to be yet further extended, without any danger that any ignitability problem should be generated in the central region of the combustion chamber where said igniting tip portion of the spark plug is typically located. The flame propagation distance in the combustion chamber is shortened, in comparison to the case in which the spark plug is located at one side of the combustion chamber, and therefore so called compact combustion becomes possible of attainment, and extension in the lean direction of the limit for air-fuel mixture combustion and improvement in the mechanical octane value of the engine are made available.

Further, according to one particular specialization of the present invention, the diverting means may comprise a notch portion formed in said control valve, which should preferably be formed in the edge of said control valve which is on the side thereof towards said generally helical intake passage, and/or is that edge of said control valve which is its downstream edge when said control valve is in its position to maximize the flow resistance of said generally straight intake passage. Alternatively, according to another alternative particular specialization of the present invention, said diverting means may comprise an auxiliary passage formed from upstream of said control valve to a portion of said generally straight intake passage near the downstream end thereof. Either of these particular specializations may be applied in any individual case, according to conditions.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

FIG. 2 is a transverse sectional view taken through said cylinder head incorporating said first preferred embodiment structure of the present invention as seen from underneath the cylinder head looking upwards, the sectional plane of this drawing being somewhat distorted and being generally indicated by the arrows II—II in FIG. 1;

FIG. 3 is a partial sectional view taken through said cylinder head incorporating said first preferred embodiment structure of the present invention as seen from the outside of the intake port structure thereof looking inwards at a straight intake passage control valve fitted therein, the sectional plane of this drawing being generally indicated by the arrows III—III in FIGS. 1 and 2;

DESCRIPTION OF THE PREFERRED EMBODIMENTS

The present invention will now be described with reference to the preferred embodiments thereof, and with reference to the figures.

The First Preferred Embodiment

Construction

Figure 1:
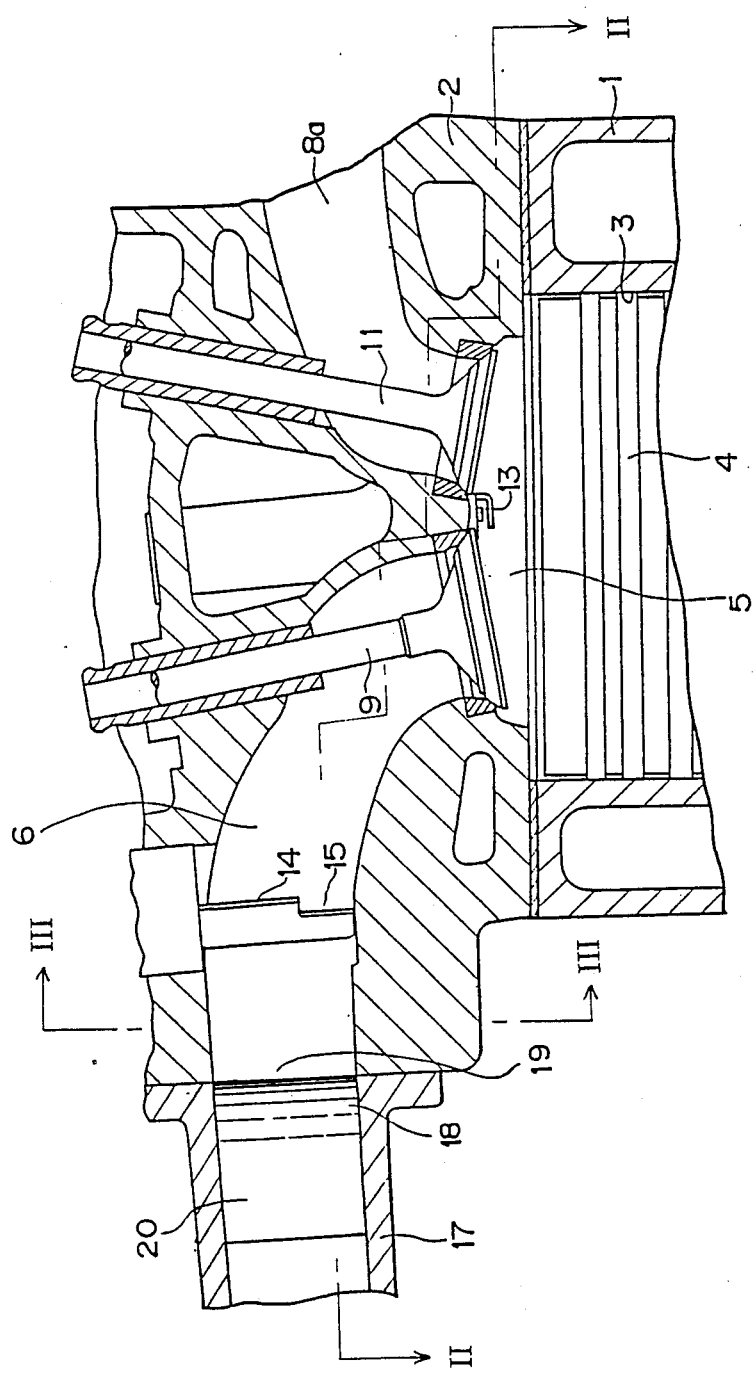
FIG. 1 is an axial longitudinal sectional view showing an internal combustion engine cylinder bore, a piston slidably fitted in said cylinder bore, a portion of a cylinder head incorporating the first preferred embodiment of the variable swirl siamese type intake port structure of the present invention fitted over said cylinder bore, and a combustion chamber defined by said cylinder bore and said portion of said cylinder head, this sectional view being taken in a somewhat distorted plane shown by the arrows I—I in FIG. 2.

In the first preferred embodiment of the cylinder head intake port structure of the present invention, shown in longitudinal sectional view in FIG. 1 and in transverse sectional view in FIG. 2, the reference numeral 1 denotes the cylinder block of the engine, while on this cylinder block 1 there is fitted a cylinder head, which is the first preferred embodiment of the cylinder head intake port structure of the present invention, denoted by the reference numeral 2. The cylinder block 1 is formed with a plurality of cylinder bores 3 of which only one is shown in FIG. 1 because the section of FIG. 1 is taken in a plane including the central longitudinal axis of said shown cylinder bore 3 and substantially perpendicular to the plane including the central longitudinal axes of all said cylinder bores 3. In this cylinder bore 3 there reciprocates a piston 4, and between said piston 4, said cylinder head 2, and the upper portion of said cylinder bore 3 there is defined a combustion chamber 5 for this piston and cylinder. And the fitting of the cylinder head 2 to the cylinder block 1 is done by the use of cylinder head bolts, not particularly shown, fitted through cylinder head bolt holes formed in bosses, not particularly shown, formed in the cylinder head 2 between each pair of adjacent cylinders and at the ends of the row of cylinders.

For each cylinder, the cylinder head 2 is formed with two intake ports 6 and 7 and two exhaust ports 8a and 8b, all four of which which open via respective valve seats to the combustion chamber 5, with the centers of said four valve seats approximately at the corners of a square, as generally shown in FIG. 2. Thus, this internal combustion engine is of the four valve per cylinder type. And the intake ports 6 and 7 for each of the cylinders of this engine are arranged on the one side of the cylinder block 1 and the cylinder head 2, in the longitudinal direction of said cylinder head 2 along the row of cylinders thereof (which corresponds to the direction perpendicular to the drawing paper in FIG. 1 and to the horizontal direction in FIG. 2); and, similarly, the exhaust ports 8a and 8b for each of the various cylinders are arranged on the other side to said one side of the cylinder block 1 and of the cylinder head 2. Poppet valves 9 and 10 (of which only the poppet valve 9 can be seen in the sectional view of FIG. 1) of a per se known type, mounted in per se known valve guides fitted in the cylinder head 2, are provided for cooperating with intake valve seats inset around the edges of each of the intake ports 6 and 7 where they open to the combustion chamber 5, so as to provide open/close control of communication between said intake ports 6 and 7 and the combustion chamber 5; and two other poppet valves 11a and 11b, also per se known and mounted in per se known valve guides fitted in the cylinder head 2, and again only one of which can be seen in FIG. 1, are provided for similarly cooperating with exhaust valve seats inset around the edges of the exhaust ports 8a and 8b where they open to the combustion chamber 5, so as similarly to provide open/close control of communication between the communication between said exhaust ports 8a and 8b and said combustion chamber 5. And by actuation of these intake poppet valves 9 and 10 and exhaust poppet valves 11a and 11b by a per se known type of valve gear not particularly shown, the internal combustion engine is caused to operate according to an Otto cycle so as to generate rotational power, as is per se conventional. And, as best seen in FIG. 2, substantially in the middle of the portion of the cylinder head 2 defining the roof of the combustion chamber 5 there is formed a screwed hole 12 for fitting a spark plug 13 thereinto.

In more detail, the cylinder head is formed with an intake plenum 19 opening at its outside left side as seen in the figures, and this intake plenum branches into the two intake ports 6 and 7. The intake port 6 is formed as a generally straight intake passage, while the other intake port 7 is formed as a generally helical intake passage. A flow of air-fuel mixture is sucked into the combustion chamber 5 of the engine from a carburetor, not particularly shown, fitted to an intake manifold 17 which is fitted to this cylinder head 2 and is formed with an intake passage 20 abutted against the intake plenum 19 so as to be communicated therewith. This flow of air-fuel mixture first enters the cylinder head 2 into the intake plenum 19 upstream of the two intake ports 6 and 7, and then is divided by impinging upon the upstream edge of a dividing wall 30 which separates said two intake ports 6 and 7, so that part of said air-fuel mixture flow enters into the upstream end of the generally straight intake port 6 while the remainder of said air-fuel mixture flow enters into the upstream end of the generally helical intake port 7. The generally straight intake port 6 debouches into the combustion chamber 5 through the valve seat controlled by the intake poppet valve 9, while the generally helical intake port 7 debouches into the combustion chamber 5 through the valve seat controlled by the other intake poppet valve 10. Thus, the lower side as seen in the view of FIG. 2 of the downstream portion of the air-fuel mixture intake system defines the generally helical intake port 7, so that air-fuel mixture flowing through this generally helical intake port 7, when the intake poppet valve 10 is opened of course, impinges against a vortex portion 31 formed around the stem of said intake poppet valve 10 in said helical port 7 and is imparted with substantial swirling motion.

In the upstream end or intake end of the generally straight intake port 6, just downstream of where said generally straight intake port 6 branches off from the intake plenum 19, there is provided a butterfly type air-fuel mixture intake control valve 14, which is fixedly mounted on a shaft not particularly shown and is selectively positioned via said shaft by an actuating device of a per se well known sort, likewise not particularly shown, to either one of a closed position as shown in FIGS. 2 and 3 in which said air-fuel mixture intake control valve 14 substantially closes said upstream end of said generally straight intake port 6 while of course leaving uninterfered—with said generally helical intake port 7, or an open position, angularly spaced approximately 90 from said shown closed position, in which said air-fuel mixture intake control valve 14 substantially leaves said upstream end of said generally straight intake port 6 open and uninterfered with. For example, this air-fuel mixture intake control valve 14 may be controlled by said actuating device so as substantially to close said generally straight intake port 6, when and only when engine load is below a certain determinate value.

Particularly according to the inventive concept of the present invention, the intake control valve 14 is formed with a cutaway portion 15 on its side towards the generally helical intake port 7, i.e. on its side towards the center of the intake port structure, so that the direction looking through said cutaway portion 15 down the generally straight intake port 6 in the direction of air-fuel mixture flow towards the combustion chamber 5 aims generally at or near the spark plug 13. This cutaway portion or notch portion 15 is preferably formed with a relatively small dimension, the cross sectional area thereof being more preferably about 15% or less of the cross sectional area of the portion of the generally straight intake port 6 at which the intake control valve 14 is fitted. And, as shown in FIG. 2, when the intake control valve 14 is selectively positioned via its shaft by the actuating device therefor to its closed position in which said valve 14 substantially closes said upstream end of said generally straight intake port 6, then the cutaway portion 15 thereof is positioned at its most downstream side, i.e. the edge of said air-fuel mixture intake control valve 14 in which said cutaway notch portion 15 is cut is the downstream edge of said valve 14 when said valve 14 is in the closed position, while the edge opposite to said notched edge is in such circumstances the upstream edge thereof.

Further, according to a particular specialization of the inventive concept of the present invention, the side of the intake manifold 17, just where the downstream end of said intake manifold 17 is abutted to the side of the cylinder head 2 against the intake plenum 19, is formed with a bulge 18, configured in this example as defined by a gradually inwardly sloping wall 18a on its upstream side and a sharply outwardly extending wall 18b on its downstream side. Thus, when air-fuel mixture is being sucked in through the intake manifold 17 into the intake plenum 19 by the operation of the internal combustion engine, said air-fuel mixture is preferentially deflected towards the central portion of the intake plenum 19 by this bulge 18, thus being preferentially directed towards the central portion of the control valve 14 which is on the side of the generally helical intake passage 9, i.e. towards the side of said control valve 14 which is formed with the notched portion 15.

Operation

This first preferred embodiment of the intake port structure of the present invention operates as follows.

When the air-fuel mixture intake control valve 14 is in the closed operational condition—typically as mentioned above when engine load is lower than a determinate value—then flow of air-fuel mixture through the generally straight intake port 6 is interrupted, and most of the air-fuel mixture flow inhaled by the engine from the carburetor (not shown) through the intake manifold 17 enters into the upstream end of the generally helical intake port 7, and passes through the intake valve port controlled by the intake poppet valve 10 into the combustion chamber 5 with a substantial amount of swirling being imparted to said sucked in air-fuel mixture as it enters said combustion chamber 5 by the vortex portion 31 formed around the stem of said intake poppet valve 10; this swirling is, as shown by the arrow A in FIG. 2, in the counterclockwise direction as seen from the point of view of that figure around the central axis of the cylinder bore 3. However, a certain relatively small amount of air-fuel mixture is also sucked, from the intake plenum 19 through the notched portion 15 of the closed control valve 14, along down through the generally straight intake port 6 as shown by the arrow "B" in FIG. 2 on the side thereof towards the generally helical intake port 7, and comes squirting out the downstream end of said generally straight intake port 6 into the combustion chamber 5 substantially straight at the ignition point of the spark plug 13 in a direct stream as shown by the arrow "C" in FIG. 2, cutting substantially radially across the aforementioned counterclockwise swirling flow "A" of the main flow of sucked in air-fuel mixture. Thereby, the initially centrifugally dispersed air-fuel mixture in said counterclockwise swirling flow "A" is entrained into said direct flow "C" and is sucked towards the ignition point of the spark plug 13 as a combined flow "D", thus ensuring that the air-fuel mixture in the center area of the combustion chamber 5 is not particularly weaker than the air-fuel mixture at the edge area thereof—in contrast to what was the case with the prior art as described earlier in this specification. Therefore, even if the overall air/fuel ratio as supplied by the carburetor (not particularly shown) is set to be relatively weak, thus taking advantage of an extension in the lean direction of the air/fuel ratio of the air-fuel mixture for the engine, nevertheless a relative plenitude of fuel is available near the ignition point of the spark plug 13, and accordingly good ignition performance becomes available, and engine misfiring is not liable to occur. Further, since the collision of the counterclockwise swirling flow "A" with the direct flow "C" engenders microturbulence in the mixed flow, the ignition characteristics of the resulting mixture flow are further improved, and thereby the limit for weakening the air-fuel mixture is further extended. And, since the direct flow "C" collides with the counterclockwise swirling flow "A" near the final point of said counterclockwise swirling flow "A", said direct flow "C" does not greatly attenuate said counterclockwise swirling flow "A". Yet further, since the direct flow "C" spurting out of the downstream end of the generally straight intake port 6 in fact is aimed slightly to the upper side as seen in the FIG. 2 view of the igniting portion of the spark plug 13, i.e. slightly on the side of said spark plug 13 against the direction of the swirling air-fuel flow "A" in the combustion chamber 5 induced by the generally helical intake port 7, thereby the macroturbulence or large scale swirling of the mixture in the combustion chamber 5 in the collision area between the direct flow "C" and the counterclockwise swirling flow "A" is partially cancelled, thereby again improving ignition performance, militating against engine misfiring, improving ignition characteristics, and further extending the limit for weakening the air-fuel mixture.

On the other hand, when the air-fuel mixture intake control valve 14 is in the open operational condition—typically when engine load is greater than the previously mentioned determinate value—then most of the air-fuel mixture flow inhaled by the engine from the carburetor (not shown) through the intake manifold 17 enters into the combustion chamber 5 through the generally straight intake port 6, with only a minor amount passing through the generally helical intake port 7. Accordingly, only a relatively low amount of swirling as a whole is imparted to said sucked in air-fuel mixture as it enters said combustion chamber 5 by the vortex portion 31 formed around the stem of the intake poppet valve 10. Thus, good volumetric efficiency for the engine is obtained.

The fact that, when the intake control valve 14 is positioned to its closed position in which said valve 14 substantially closes said upstream end of the generally straight intake port 6, then the notched edge of said valve 14 containing the cutaway portion 15 thereof is positioned at the most downstream side of said air-fuel mixture intake control valve 14, while the edge opposite to said notched edge is in such circumstances the upstream edge thereof, is an important feature of this first preferred embodiment of the present invention. According to this, liquid fuel which has accumulated on the walls of the intake manifold 17 which define the intake passage 20, and on the intake control valve 14 itself, is able to trickle past said control valve 14, across the surface thereof which acts as a guide panel, through said cutaway portion 15 and thence to flow through the generally straight intake port 6 to flow out thereof substantially directly above the intake poppet valve 9, thereby to enter virtually directly into the combustion chamber 5. Thereby, speed of fuel supply response is improved. This guiding of the liquid fuel accumulated on the walls of the intake manifold 17 is substantially aided by the bulge 18 formed on the side wall of said intake manifold 17, and further the atomization of at least a portion of said liquid fuel is appropriately encouraged by the particular configuration of this bulge 18 as being defined by the gradually inwardly sloping wall 18a on its upstream side and the sharply outwardly extending wall 18b on its downstream side, since this configuration aids with the shearing away of the liquid fuel as it trickles past the summit of the bulge 18.

The Second Preferred Embodiment

Figure 4:
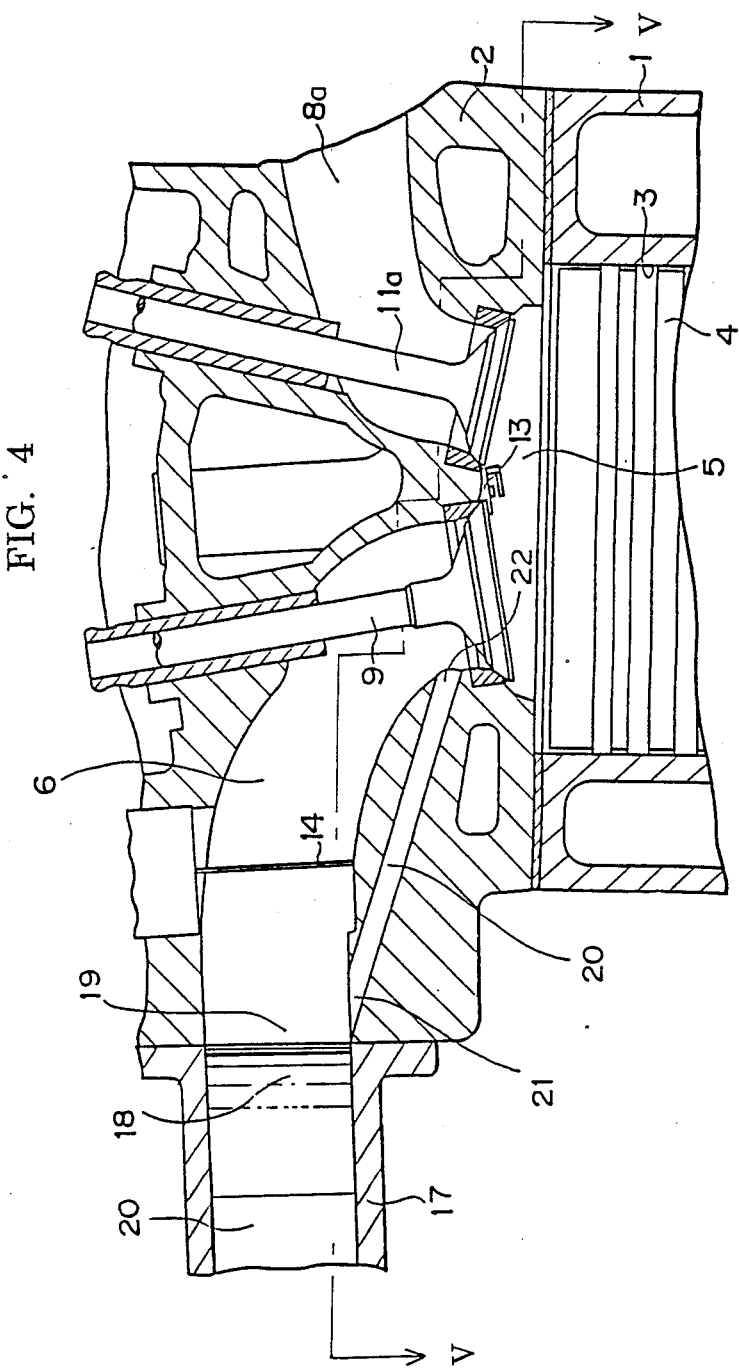
FIG. 4 is an axial longitudinal sectional view, similar to FIG. 1 relating to the first preferred embodiment, showing a cylinder bore, a piston, a portion of a cylinder head incorporating the second preferred embodiment of the variable swirl siamese type intake port structure of the present invention fitted over said cylinder bore, and a combustion chamber defined by said cylinder bore and said portion of said cylinder head, this sectional view being taken in a similarly somewhat distorted plane shown by the arrows IV—IV in FIG. 5.
Figure 5:
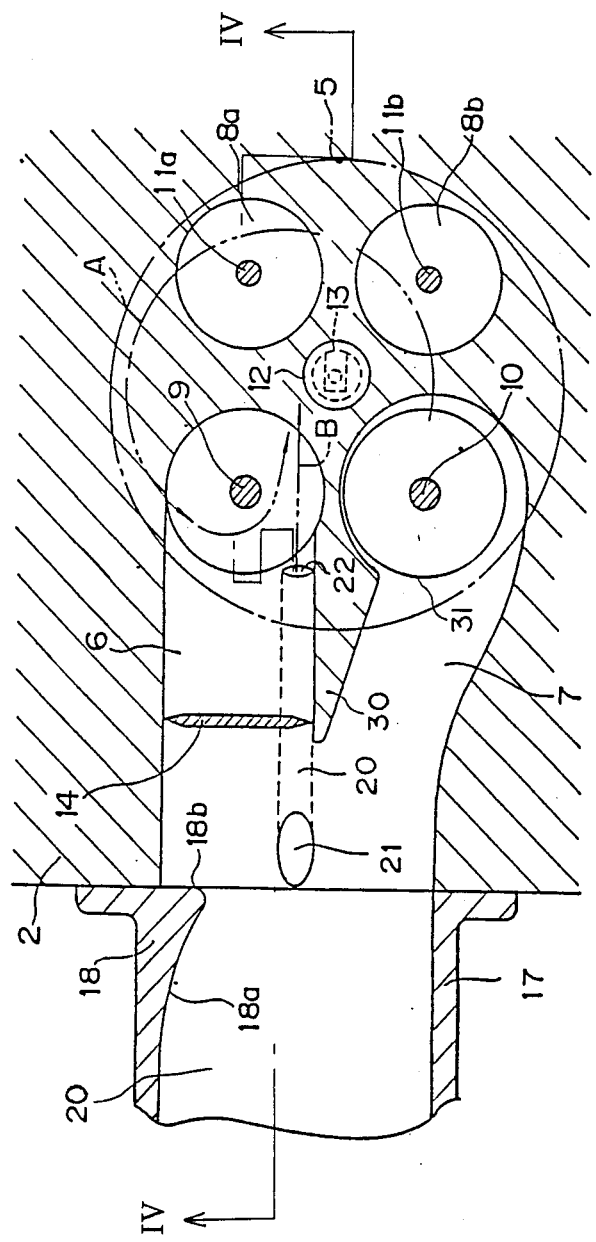
FIG. 5 is a transverse sectional view, similar to FIG. 2 relating to the first preferred embodiment, taken through said second preferred embodiment cylinder head incorporating said second preferred embodiment structure, again as seen from underneath the cylinder head looking upwards, the sectional plane of this drawing similarly being somewhat distorted and being generally indicated by the arrows V—V in FIG. 4.

The second preferred embodiment of the cylinder head intake port structure of the present invention is shown in FIGS. 4 and 5, in a similar manner to FIGS. 1 and 2 respectively relating to the first preferred embodiment; and, in FIGS. 4 and 5, like reference numerals to those in FIGS. 1 and 2 denote like parts. This second preferred embodiment differs from the first preferred embodiment described above, in that the control valve 14 for the generally straight intake port 6 is not formed with any notched or cutaway portion such as the portion 15 of the first preferred embodiment, but on the other hand, in addition to the other structures described with relation to said first preferred embodiment, a substantially straight auxiliary passage 20 is provided as extending from an inlet portion 21 upstream of the air-fuel mixture intake control valve 14, along substantially parallel to, as seen in plan view, and slightly below the generally straight intake port 6, on the side thereof towards the generally helical intake port 7, to an outlet portion 22 located proximate to the valve seat at the downstream end of said generally straight intake port 6, i.e. to the valve seat controlled by the one 9 of the intake poppet valves. This auxiliary passage 20 is as shown in the figures substantially straight and slopes relatively gently downwards, considering the engine in the orientation shown in FIG. 4 which is a typical operating orientation therefor. Thus, said substantially straight auxiliary passage 20 bypasses the air-fuel mixture intake control valve 14, performing this function instead of the gap 15 that was formed therein in the case of the first preferred embodiment described above, and leads a certain quantity of the air-fuel mixture supplied by the carburetor (not particularly shown) to the intake passage formed in the intake manifold 17, directly to just upstream of the intake poppet valve 9. Particularly according to a specialization of the concept of this second preferred embodiment of the present invention, this substantially straight auxiliary passage 20, when said poppet valve 9 is open, points generally at the igniting portion of the spark plug 13; although, more exactly, according to a particular subfeature of said shown second preferred embodiment of the present invention, said substantially straight auxiliary passage 20 in fact points slightly to the upper side as seen in the FIG. 5 view of said igniting portion of the spark plug 13, i.e. slightly on the side thereof against the direction of the swirl induced by the generally helical intake port 7. Also, according to a particular distinguishing subfeature of this second preferred embodiment of the cylinder head intake port structure of the present invention, the upstream end portion 21 of this substantially straight auxiliary passage 20 opens to the floor of the intake plenum 19. The cross sectional area of the substantially straight auxiliary passage 20 is substantially less than the cross sectional areas of the generally straight intake port 6 and the generally helical intake port 7, being about one fifth thereof in a typical constructional implementation. And the bulge 18 is formed as defined by the walls 18a and 18b, just as in the first preferred embodiment described above, and functions substantially as in said first preferred embodiment.

In this second preferred embodiment, in an analogous fashion to what occurred with the first preferred embodiment, when the control valve 14 is positioned by the actuating means (not shown) therefor to the closed position, a certain relatively small amount of air-fuel mixture is also sucked from the intake passage 20 of the intake manifold 17 through the substantially straight auxiliary passage 20 sloping relatively gently downwards, and comes squirting out of the downstream end of said substantially straight auxiliary passage 20 substantially straight at the ignition point of the spark plug 13 in a direct stream as shown by the arrow "B" in FIG. 5, cutting substantially radially across the counterclockwise swirling flow "A" of the main flow of sucked in air-fuel mixture, induced by the generally helical intake port 7. Thereby, the initially centrifugally dispersed air-fuel mixture in said counterclockwise swirling flow "A" is entrained into said direct flow "B" and is sucked towards the ignition point of the spark plug 13 along with said direct flow "B", thus, as in the case of the first preferred embodiment, ensuring that the air-fuel mixture in the center area of the combustion chamber 5 is not particularly weaker than the air-fuel mixture at the edge area thereof. Therefore, even if the overall air/fuel ratio as supplied by the carburetor (not particularly shown) is set to be relatively weak, a relative plenitude of fuel is available near the ignition point of the spark plug 13, and accordingly good ignition performance becomes available, and engine misfiring is not liable to occur; and, further, since the collision of the counterclockwise swirling flow "A" with the direct flow "B" engenders microturbulence in the mixed flow, the ignition characteristics of the resulting mixture flow are further improved, and thereby the limit for weakening the air-fuel mixture is further extended. As before, since the direct flow "B" collides with the counterclockwise swirling flow "A" near the final point of said counterclockwise swirling flow "A", said direct flow "B" does not greatly attenuate said counterclockwise swirling flow "A". Yet further, since, according to the previously mentioned particular feature of the shown second preferred embodiment of the present invention, the direct flow "B" spurting out of the substantially straight auxiliary passage 20 in fact is aimed slightly to the upper side as seen in the FIG. 5 view of the igniting portion of the spark plug 13, i.e. slightly on the side of said spark plug 13 against the direction of the swirling air-fuel flow "A" in the combustion chamber 5 induced by the generally helical intake port 7, thereby the macroturbulence or large scale swirling of the mixture in the combustion chamber 5 in the collision area between the direct flow "B" and the counterclockwise swirling flow "A" is partially cancelled, thereby again improving ignition performance, militating against engine misfiring, improving ignition characteristics, and further extending the limit for weakening the air-fuel mixture.

On the other hand, when the air-fuel mixture intake control valve 14 is in the open operational condition—typically when engine load is greater than the previously mentioned determinate value—then most of the air-fuel mixture flow inhaled by the engine from the carburetor (not shown) through the intake manifold 17 enters into the combustion chamber 5 through the generally straight intake port 6, with only a minor amount passing through the generally helical intake port 7. Accordingly, only a relatively low amount of swirling as a whole is imparted to said sucked in air-fuel mixture as it enters said combustion chamber 5 by the vortex portion 31 formed around the stem of the intake poppet valve 10. Thus, good volumetric efficiency for the engine is obtained. Since a certain relatively small amount of air-fuel mixture is also, in this operational condition as well, sucked through the substantially straight auxiliary passage 20 into the center area of the combustion chamber 5, thereby engine volumetric efficiency is increased even further.

Further, according to an important feature of this second preferred embodiment of the present invention, liquid fuel which has accumulated on the walls of the intake manifold 17 which define the intake passage 20 is able to trickle down into the upstream end portion 21 of the auxiliary passage 20 and is able to be transferred through said auxiliary passage 20 to flow out thereof substantially directly above the intake poppet valve 9, thereby to enter virtually directly into the combustion chamber 5. Thereby, again, speed of fuel supply response is furthermore improved.

A further beneficial effect of this second preferred embodiment is that, in all operational circumstances, some of the air-fuel mixture supplied to the intake plenum 19 from the intake manifold 17 is supplied into the straight intake port 6, and inevitably, when said air-fuel mixture intake control valve 14 is in the closed operational condition as shown in FIG. 5, some of the fuel in this air-fuel mixture will condense out in liquid form on said air-fuel mixture intake control valve 14 and on the defining surfaces of the straight intake port 6 immediately above said valve 14. This condensed out liquid fuel, according to the shown second preferred embodiment type construction, reliably trickles downwards and enters into the upstream end portion 21 of the substantially straight auxiliary passage 20, to pass down said auxiliary passage 20 and to then exit through the exit portion 22 thereof, to be deposited near the intake poppet valve 9 for entering into the combustion chamber 5 of the engine. Thus, worsening of the fuel supply response during transient engine operational conditions is militated against, and a relatively rich mixture is supplied to the combustion chamber from the straight intake port 6, thus providing a stable rich mixture good for ignition purposes in the ignition region of the spark plug 13, and thus extending even further the weak mixture limit of combustibility.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A variable swirl siamese type intake port structure for an internal combustion engine cylinder head formed with a combustion chamber to which a spark plug having an ignition point is provided, comprising:

a first generally straight intake passage which leads to a first intake port opening to said combustion chamber;

a second generally helical intake passage which leads to a second intake port, also opening to said combustion chamber, formed with a helical end vortex portion;

a control valve fitted in said first generally straight intake passage at an upstream portion thereof so as to control its flow resistance;

a means, provided to said generally straight intake passage on the side thereof towards said generally helical intake passage, for, when said control valve is in its position to maximize the flow resistance of said generally straight intake passage, diverting a relatively minor proportion of air-fuel mixture sucked into said intake port structure from a point upstream of said control valve to a point near the downstream end of said first generally straight intake passage, bypassing said control valve; and:

a means for biasing flow of air-fuel mixture sucked into said intake port structure towards said diverting means.

2. A variable swirl siamese type intake port structure for an internal combustion engine cylinder head according to claim 1, wherein the flow resistance of said diverting means both is substantially greater than the flow resistance of said first generally straight intake passage and said first intake port, and is substantially greater than the flow resistance of said second generally helical intake passage and said second intake port.

3. A variable swirl siamese type intake port structure for an internal combustion engine cylinder head according to claim 1, said spark plug being provided in the generally central portion of said combustion chamber, wherein the flow of air-fuel mixture through said diverting means points through said first intake port, when open, generally in the radial direction of said combustion chamber.

4. A variable swirl siamese type intake port structure for an internal combustion engine cylinder head according to claim 1, wherein the flow of air-fuel mixture through said diverting means points through said first intake port, when open, into said combustion chamber in a direction somewhat to tend to cancel large scale turbulence induced in said combustion chamber by flow through said generally helical intake passage and said second intake port.

5. A variable swirl siamese type intake port structure for an internal combustion engine cylinder head according to claim 1, wherein the flow of air-fuel mixture through said diverting means points through said first intake port, when open, into said combustion chamber in a direction somewhat to that side of said ignition point of said spark plug in the direction to tend to cancel large scale turbulence induced in said combustion chamber by flow through said generally helical intake passage and said second intake port.

6. A variable swirl siamese type intake port structure for an internal combustion engine cylinder head according to claim 3, wherein the flow of air-fuel mixture through said diverting means points through said first intake port, when open, into said combustion chamber in a direction somewhat inclined to the radial direction thereof in the sense to tend to cancel large scale turbulence induced in said combustion chamber by flow through said generally helical intake passage and said second intake port.

7. A variable swirl siamese type intake port structure for an internal combustion engine cylinder head according to claim 1, wherein said diverting means comprises a notch portion formed in said control valve.

8. A variable swirl siamese type intake port structure for an internal combustion engine cylinder head according to claim 1, wherein said diverting means comprises an auxiliary passage formed from upstream of said control valve to a portion of said generally straight intake passage near the downstream end thereof.

9. A variable swirl siamese type intake port structure for an internal combustion engine cylinder head according to claim 7, wherein the edge of said control valve in which said notch portion is formed is that edge thereof which is on the side thereof towards said generally helical intake passage.

10. A variable swirl siamese type intake port structure for an internal combustion engine cylinder head according to claim 7, wherein the edge of said control valve in which said notch portion is formed is that edge thereof which is its downstream edge when said control valve is in its position to maximize the flow resistance of said generally straight intake passage.

11. A variable swirl siamese type intake port structure for an internal combustion engine cylinder head according to claim 1, wherein said biasing means is a bulge.

* * * * *